(12) United States Patent
Naude

(10) Patent No.: US 7,211,014 B2
(45) Date of Patent: May 1, 2007

(54) VARIABLE SPROCKET IVT MACHINE

(75) Inventor: Johannes Jacobus Naude, Randburg (ZA)

(73) Assignee: Varibox (Pty) Limited, Randburg (ZA)

( * ) Notice: Subject to any disclaimer, the term of this patent is extended or adjusted under 35 U.S.C. 154(b) by 204 days.

(21) Appl. No.: 10/508,181

(22) PCT Filed: Mar. 17, 2003

(86) PCT No.: PCT/ZA03/00039

§ 371 (c)(1),
(2), (4) Date: Sep. 17, 2004

(87) PCT Pub. No.: WO03/078869

PCT Pub. Date: Sep. 25, 2003

(65) Prior Publication Data

US 2005/0148416 A1    Jul. 7, 2005

(30) Foreign Application Priority Data

Mar. 18, 2002   (ZA) ................................ 2002/2168

(51) Int. Cl.
*F16H 9/02* (2006.01)
*F16H 59/00* (2006.01)
*F16H 61/00* (2006.01)
*F16H 63/00* (2006.01)

(52) U.S. Cl. .......................................... 474/49; 474/47

(58) Field of Classification Search ............... 474/8, 474/47, 48, 49, 55, 56, 57
See application file for complete search history.

(56) References Cited

U.S. PATENT DOCUMENTS

| 1,663,414 A | | 3/1928 | Mize | |
|---|---|---|---|---|
| 2,028,577 A | * | 1/1936 | Vincenzoni | 74/112 |
| 4,618,331 A | | 10/1986 | Deal | |
| 4,741,546 A | * | 5/1988 | Reswick | 280/236 |
| 6,447,421 B1 | * | 9/2002 | Wren | 475/170 |
| 2005/0221926 A1 | * | 10/2005 | Naude | 474/8 |

FOREIGN PATENT DOCUMENTS

| DE | 43 29 441 | 3/1995 |
|---|---|---|
| FR | 779 702 | 4/1935 |
| NL | 9 300 268 | 9/1994 |

* cited by examiner

*Primary Examiner*—Richard Ridley
*Assistant Examiner*—Terence Boes
(74) *Attorney, Agent, or Firm*—Young & Thompson

(57) ABSTRACT

A variable sprocket IVT machine has a sprocket wheel, on an input shaft, including a plurality of wheel bodies which are independently rotatable on the shaft, a sprocket slidably located in and projecting radially from a sleeve in each wheel body, connecting arrangements, connecting the wheel bodies in the composite wheel, which are adapted to vary the angular disposition between and the degree of radial projection of adjacent sprockets relatively to each other to ensure clean engagement of the sprockets with uniformly spaced apertures in a drive chain which partially surrounds the wheel in a radially movable zone of sprocket engagement, elements for engaging the wheel bodies of the sprockets in the zone with the input shaft and a control arrangement which supports the sprockets not in the zone and which is movable to vary the ratio of rotation of the input shaft relatively to a chain driven output shaft.

12 Claims, 6 Drawing Sheets

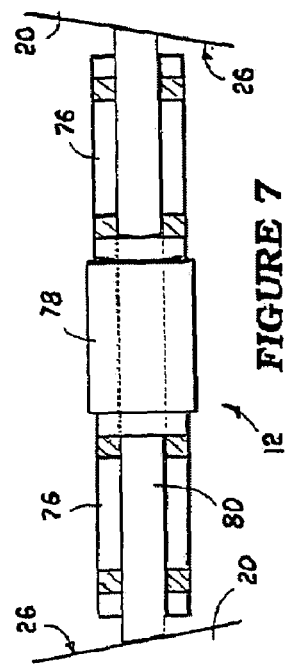
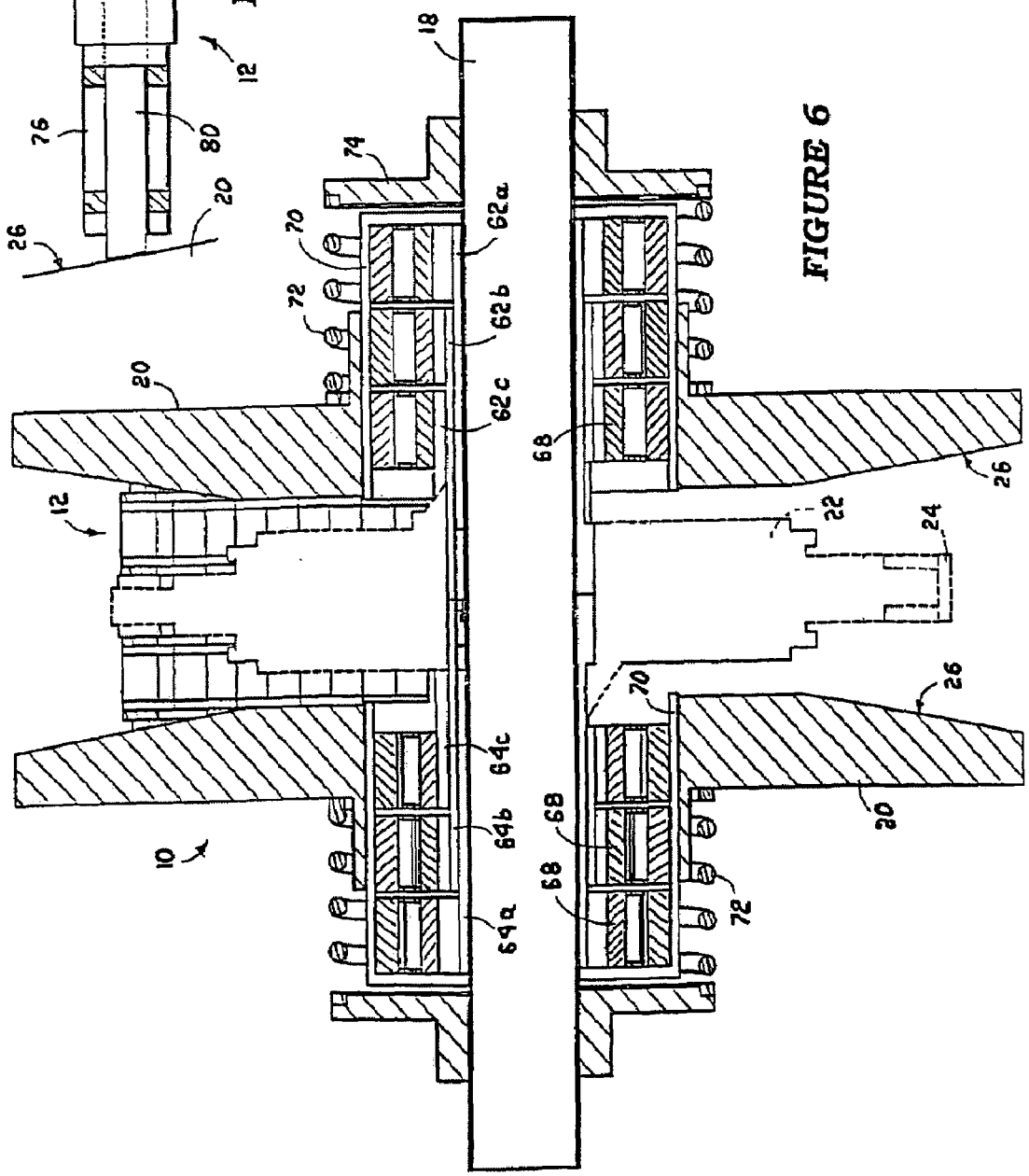

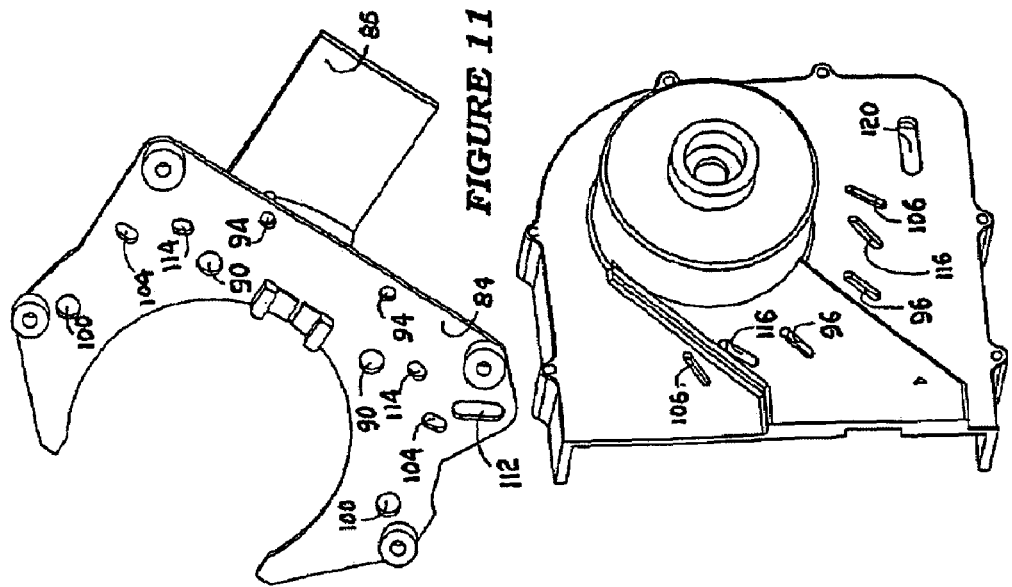
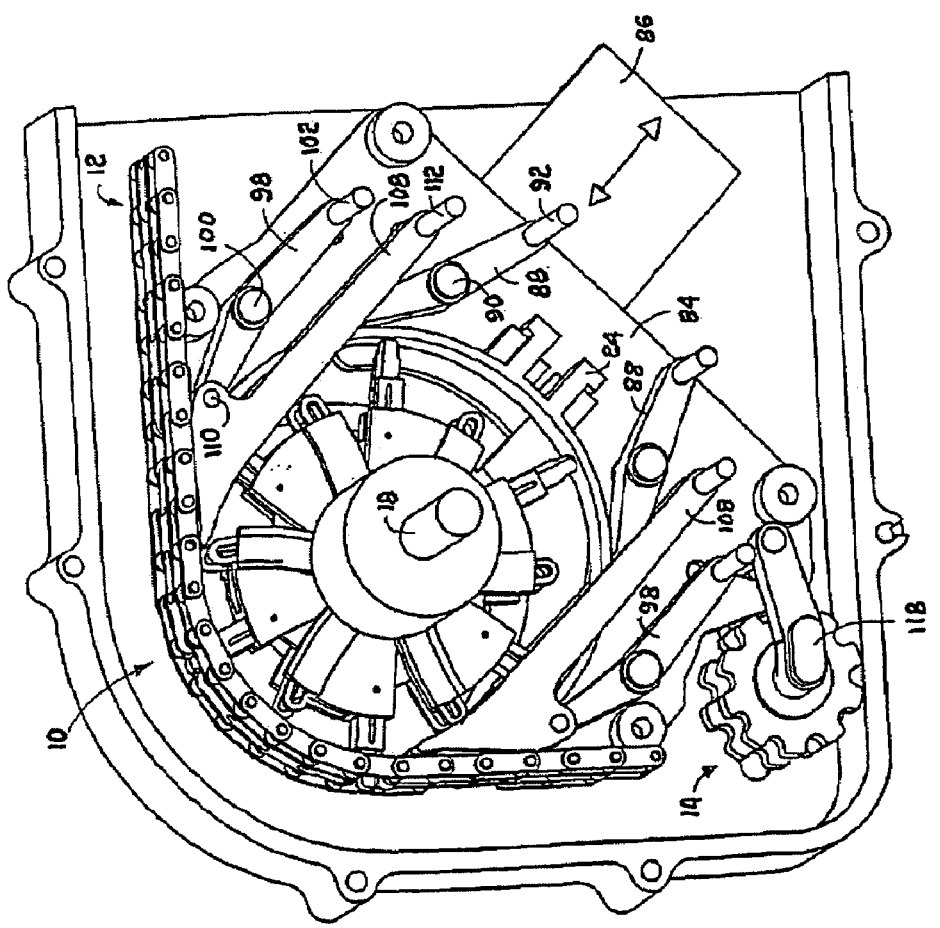

VARIABLE SPROCKET IVT MACHINE

FIELD OF THE INVENTION

This invention relates to an infinitely variable transmission (IVT) machine in which the ratio of rotation between the input and output shafts of the machine is steplessly infinitely variable by means of a sprocket wheel which is variable in diameter.

BACKGROUND TO THE INVENTION

A significant body of prior art relating to IVT machines of the above type exists. Typical examples of these are described in the following publications: U.S. Pat. No. 4,878,883, GB2062142A, GB2135743A, U.S. Pat. Nos. 4,618,331, 3,956,944 and 5,984,814.

It will be seen from the specifications of U.S. Pat. Nos. 4,618,331 and 3,956,944 that these machines largely consist of radially positionable engagement devices that operate, either by means of sprocket teeth or frictionally, within fixed tracks which are spaced radially about the variable sprocket hub. Because of the limited number of engagement devices the flexible member track around them does not constitute a circular arc and their outputs are as a result, pulsed. Another problem with these prior art machines is the non-exact synchronisation of their engagement devices with the flexible member (chain) links where engagement is accomplished via spring loaded sprocket teeth or rotatable full sprockets operating in the fixed guides which make these devices only suitable for low speed applications, for example, on bicycles. In high speed and high torque applications the above prior art machines are not suitable.

SUMMARY OF THE INVENTION

A variable sprocket IVT machine according to the invention comprises an angular velocity input shaft, a sprocket wheel which is rotatably mounted on the input shaft and includes a plurality of elongated sprockets which are each telescopically located in and project in a common plane from radially oriented sleeves in the wheel, an endless flexible drive element which is spaced from and partially surrounds the sprocket wheel in a zone in which it is sprocket-driven and includes apertures which are spaced at uniform intervals over its length and in which the free ends of the sprockets are sequentially engageable to drive the element as the sprocket wheel is rotated by the input shaft, a track arrangement on which the edges of the drive element are supported in its drive zone, means for varying the radius of the drive element drive zone on the track arrangement, a drive element tensioning arrangement for maintaining tension on the drive element as the diameter of the drive element drive zone on the track arrangement is varied, and an output shaft which is driven by the drive element, with the invention being characterised in that each of the sprocket wheel sleeves is located in a wheel body which is independently rotatable relatively to the remaining wheel bodies on the input shaft, connecting arrangements connecting the wheel bodies to each other to provide a composite sprocket wheel with the connecting arrangements being adapted to regulate the degree of angular disposition of each wheel body relatively to the following body in the composite wheel and the radial dimension of the sprockets carried by them in a predetermined relationship so that irrespective of the radial distance separating the drive element drive zone from the input shaft a sprocket which is engaged in a drive element aperture in the drive zone will position the free end of the following sprocket exactly for engagement in the next drive element aperture, means for supporting the sprockets of the sprocket wheel which are not engaged with the drive element during rotation of the composite sprocket wheel, means for engaging the wheel bodies of the sprockets which are engaged with the endless flexible member, with the input shaft, and a control arrangement for moving the sprocket support means to vary the ratio of rotation of the output shaft relatively to the input shaft during operation of the machine.

The sleeves in the wheel bodies may be slidably movable in passages in the wheel bodies.

The wheel body connecting arrangements each preferably include a formation on the wheel body which extends in a substantially radial direction from the input shaft axis at a predetermined angle to the wheel body sleeve and which is curved to have a concave shape towards the sleeve and means, on the sprocket of a leading adjacent wheel body in the direction of rotation on the sprocket wheel, which is slidably engageable with the curved formation of the sprocket body immediately trailing it in the sprocket wheel. The formation engaging means on the sprockets are conveniently lugs which are fixed to and project from the sprockets away from the direction of rotation of the sprocket wheels.

The radially extending formation on each of the wheel bodies may be a slot and the sprocket lugs each carry a pin which is slidably located in the slot formation of the wheel body behind it in the direction of rotation of the sprocket wheel. The slot formation on each wheel body may be located in a guide plate which is slidably located in the substantially radial direction in a complementally shaped recess in the wheel body.

The track arrangement for supporting the drive element could be located on the machine input shaft and includes a disc on either side of the sprocket wheel with each disc including, from a central zone of its face which faces the sprocket wheel, a surface which tapers outwardly from the central zone to the periphery of the disc with the tapered surfaces of the discs providing between them a track on which the edges of the drive element are supported and means biasing each of the discs towards the other.

The means for engaging the wheel bodies with the machine input shaft may be one-way sprag clutches and means connecting each of the clutches to a wheel body of the sprocket wheel.

The connecting means are in one form of the invention tubes which are located concentrically one within the other on the machine input shaft with the tubes being divided into two sets which each face away from the sprocket wheel with each fixed at one end to a wheel body and at the other end to the inner race of a spag clutch.

The IVT machine may include a cup-shaped drive housing which is located over each set of sprag clutches on either side of the sprocket wheel with their closed ends fixed to the input shaft, their open ends to the drive element track arrangement discs and their inner surfaces to the outer races of the sprag clutches so that each of the clutches, attached to a wheel body while its sprocket is in the drive zone of the drive element, will lock in a common direction of rotation of the sprocket wheel to the input shaft.

The sprocket support means may comprise an arcuate spring blade element which partially surrounds the sprocket wheel with its inner surface providing a track on which the free ends of the sprockets, which are not engaged with the drive element, run during rotation of the sprocket wheel.

The control arrangement preferably includes a controller for moving the arcuate element towards and away from the machine input shaft and means for concomitantly moving its free ends inwardly or outwardly as required to maintain its circularity with the drive element drive zone.

A variable sprocket wheel for ratio changing in an IVT machine according to the invention comprises a sprocket wheel which is rotatably mounted on an input shaft of the machine and includes a plurality of elongated sprockets which are each slidably located in and project in a common plane from radially oriented sleeves in the wheel, characterised in that the sprocket wheel is a composite wheel including a plurality of wheel bodies which each include a sprocket sleeve, connecting arrangements connecting the wheel bodies to each other to provide the composite sprocket wheel with the connecting arrangements being adapted to regulate the degree of angular disposition of each wheel body relatively to the following body in the composite wheel and the radial dimension of the sprockets carried by them in a predetermined relationship so that irrespective of the radial distance separating the free end of a sprocket, while it is engaged with a drive element, which is to be driven by the sprocket wheel, from the input shaft, the sprocket will position the free end of the following sprocket exactly for engagement in the next drive element aperture, means for supporting the sprockets of the sprocket wheel which are not engaged with the drive element during rotation of the composite sprocket wheel, and a control arrangement for moving the sprocket support means to vary the ratio of rotation of the output shaft, of a machine employing the sprocket wheel, relatively to the input shaft during operation of the machine.

The sprocket support means may comprise an arcuate spring element which partially surrounds the sprocket wheel with its inner surface providing a track on which the free ends of the sprockets, which are not engaged with the drive element, run during rotation of the sprocket wheel.

The control arrangement may comprise a controller for moving the arcuate element towards and away from the machine input shaft and means for concomitantly moving its free ends inwardly or outwardly as required to maintain its circularity with the drive element in its zone of engagement with the wheel sprockets.

BRIEF DESCRIPTION OF THE DRAWINGS

An embodiment of the invention is now described by way of example only with reference to the drawings in which:

FIG. 6 is an end elevation of the sprocket wheel shown sectioned on the line 6—6 in FIG. 8, FIG. 7 is an end elevation of the drive chain of the machine of the invention shown sectioned across a sprocket engaging aperture in the chain, FIG. 10 is a side elevation of the sprocket wheel located in a portion of the machine casing and a control arrangement for varying the effective diameter of the sprocket wheel, FIG. 11 is a plan view, on a reduced scale, of a component of the FIG. 10 control arrangement, and FIG. 12 is an oblique view of the outside of the machine casing component shown in FIG. 10.

DETAILED DESCRIPTION OF THE PREFERRED EMBODIMENT

Figure 1:
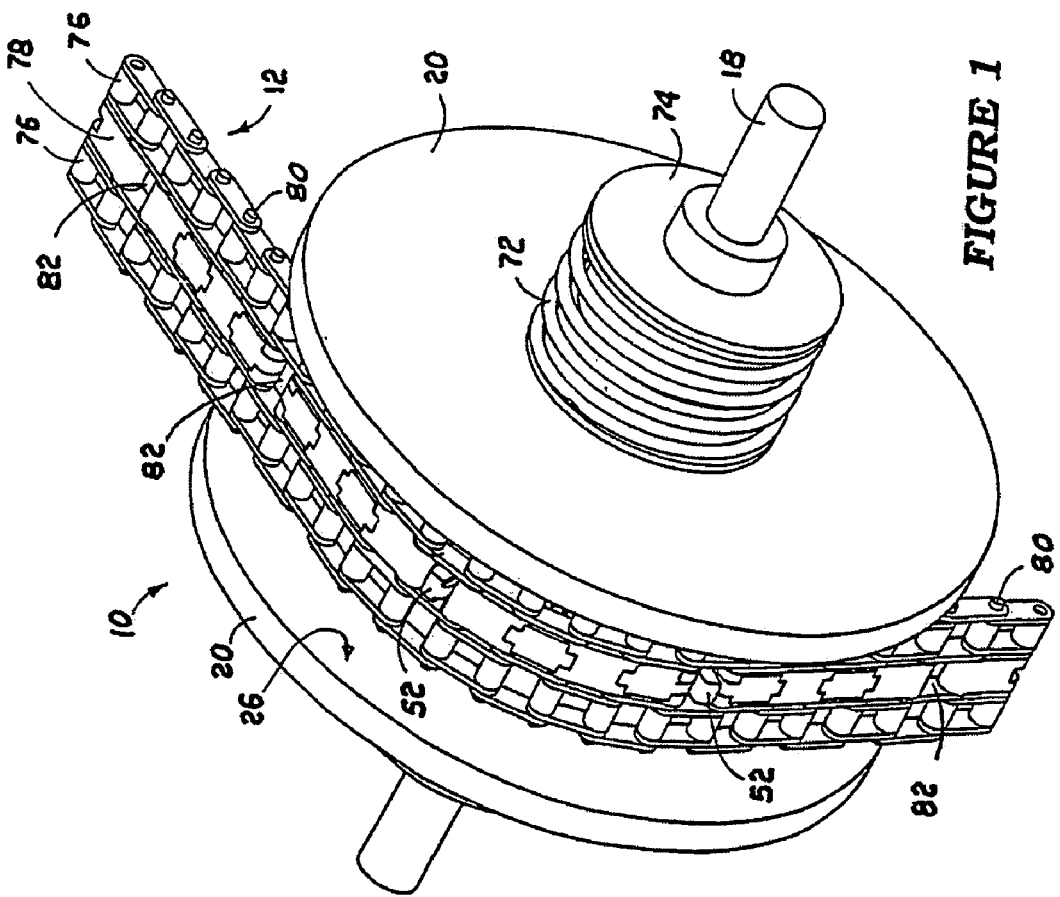
FIG. 1 is an isometric view from above of one side of the variable diameter sprocket wheel arrangement of the IVT of the invention which is shown engaged with a short length of the chain which it drives.
Figure 2:
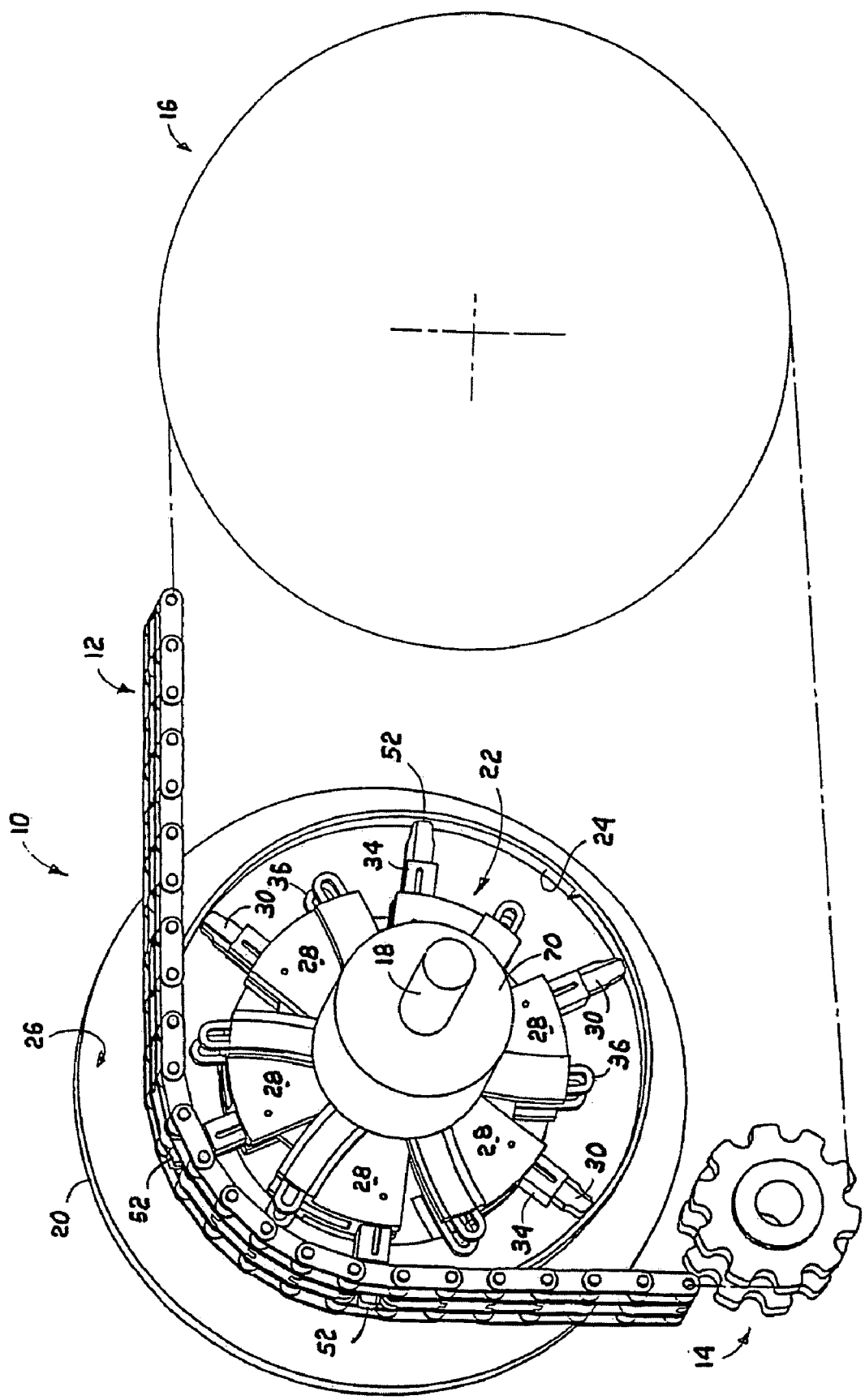
FIG. 2 is a partially diagrammatic side elevation of the IVT machine of the invention.

The IVT machine of the invention is shown in FIGS. 1 and 2 to include a variable diameter sprocket wheel assembly 10, an endless drive chain 12, a pair of chain positioning sprockets 14 and whatever is to be driven 16 by the chain 12.

The sprocket wheel assembly 10 of FIGS. 1 and 2 is shown mounted on a machine input shaft 18 and includes two opposed chain guide discs 20, a variable diameter sprocket wheel 22 and an arcuate control element 24.

The chain guide discs 20 each have flat outer faces and inner face portions 26 which taper outwardly from a central zone of the disc to its periphery as shown only diagrammatically in FIG. 7 and clearly in FIG. 6. The mounting of the discs 20 in the machine will be described below.

The sprocket wheel 22, in this embodiment of the invention, is a composite wheel which includes six identical wheel bodies 28 which each carry an elongated chain engaging sprocket 30.

Figure 3:
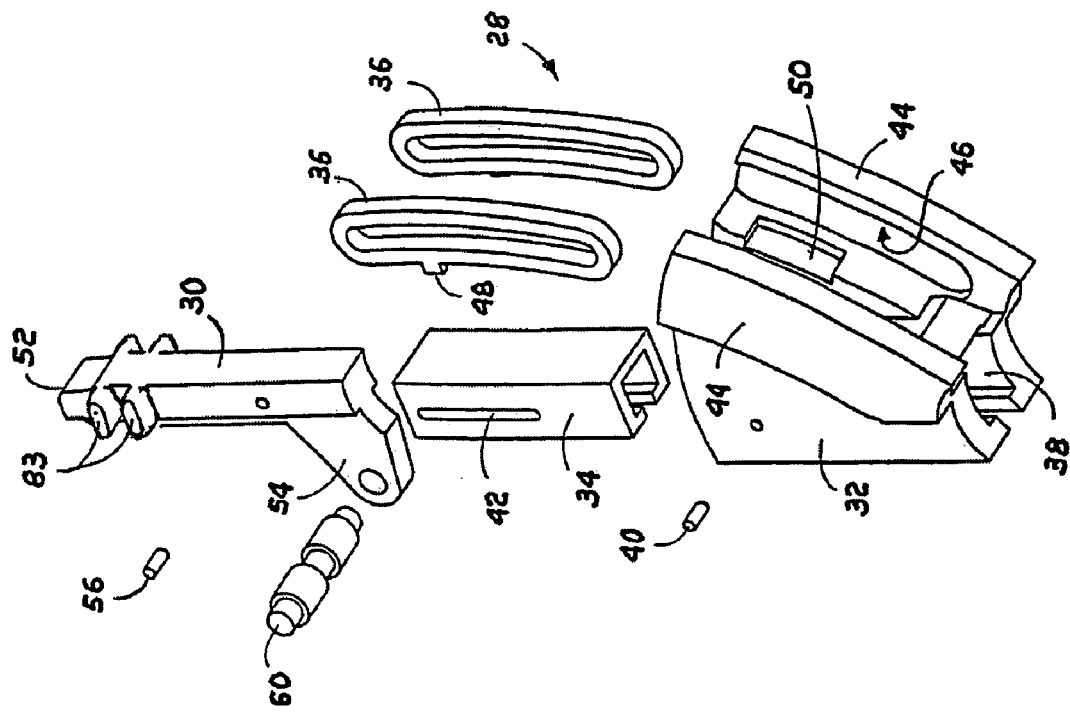
FIG. 3 is an exploded isometric view from below of a wheel body and sprocket of the composite sprocket wheel of the invention.

The wheel bodies 28 each include, as shown in FIG. 3, a segment shaped body 32, a sprocket sleeve 34 and sprocket control guides 36. The bodies 32 each includes a passage 38 in which the sleeve 34 is slidably located with its degree of movement in the passage limited by a pin 40 which is fixed in the body 32 to project a little way into a slot 42 in the wall of the sleeve and two partially arcuate and spaced formations 44 which include facing recesses 46 in which the sprocket control guides 36 are slidably located for movement in a generally radial direction from the input shaft axis at a predetermined angle to the axis of movement of the sprocket 30. The guides 36 each include a lug 48 which, in the assembled wheel body 28, are located in a slot 50 in the base of the recesses 46 to limit the sliding movement of the guides in the recesses.

The sprockets 30 each include, at their free ends, a chain engaging profiled nose 52 and, at its lower end a transversely directed lug 54. With the sprocket 30 slidably located in the sleeve 34 in the assembled wheel body 28, the lug 54 projects from the body 28 through registering slots in the sleeve 34 and the body passage 38. A pin 56 is fixed in the sprocket to project into the slot 42 in the sleeve 34. The degree of projection of the pin from the side of the sprocket is such that the ends of the pins 40 and 56 are able to bypass each other in the sleeve slot 42.

Each of the sprocket wheel sprockets 30 is connected to a wheel body 28 to the rear of it in the direction of rotation of the composite sprocket wheel 22 by a pin 60 which is shown in FIG. 3. The pin 60 passes through a hole in the sprocket lug 54 with its ends located in the arcuate apertures in the opposite control guides 36 of the wheel body 28 behind it in the composite sprocket wheel. The control guides 36 are held in their recesses by the spacers shown on the pin 60 in FIG. 3.

Figure 4:
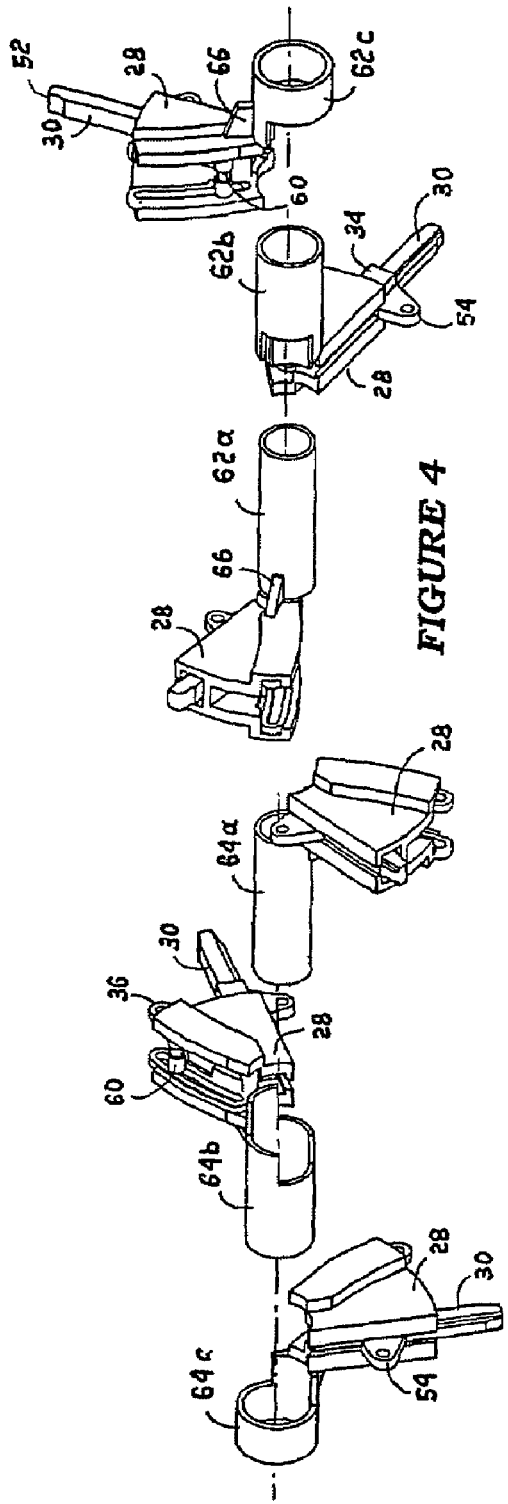
FIG. 4 is an exploded isometric view of the composite sprocket wheel of the invention.

FIG. 4 shows that each of the wheel bodies 28 of the wheel 22 is fixed to a tubular carrier. The carriers are divided into two oppositely facing sets 62 *a b c* and 64*a b c*. The tubes of the carriers in each set are so dimensioned that the tubes a are engageable with and fully rotatable on the machine input shaft 18, the tubes b are engaged with and rotatable on the tubes a and the tubes c are engaged with and rotatable on the tubes b, as shown in FIG. 5.

The attachment between each wheel body 28 and its carrier tube is strengthened by a buttress formation 66 which acts as a stop against which the edges of cut-outs in the ends of the carrier tubes b and c of each set abut to limit the degree of rotation of the tubes and so the wheel bodies attached to them relatively to the remaining wheel bodies in the composite sprocket wheel 22.

Figure 5:
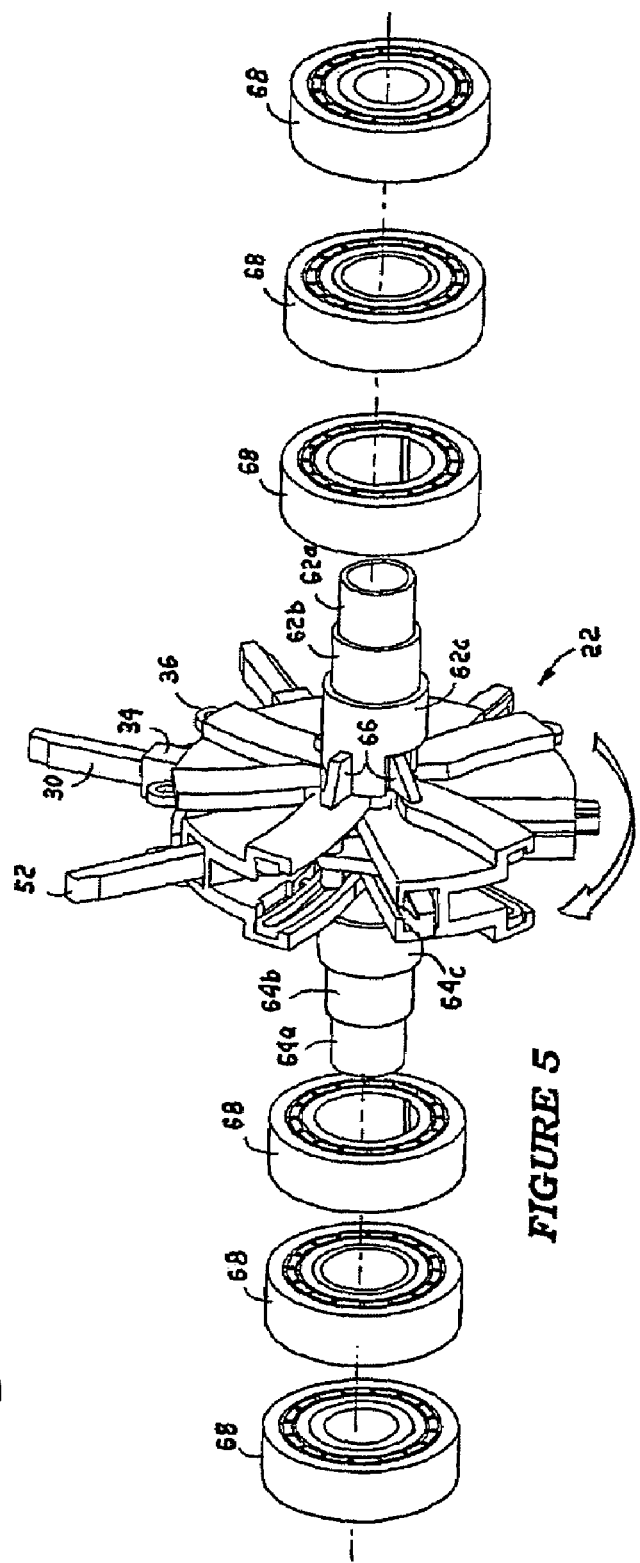
FIG. 5 is an isometric view of the assembled sprocket wheel showing one-way clutches which are attached to each of the wheel bodies exploded from the wheel.

Each of the exposed carrier tube ends in FIG. 5 has a one-way sprag clutch 68 fixed to it by means of a key or the like, not shown, which couples the inner races of the clutches to the carriers. The outer two sprag clutches 68 of each set have suitable spacer bushes which are fixed in their inner races to compensate for the step-down configuration of the carriers a and b to ensure that the outer surface of the outer clutch races are aligned. The clutches are located on the carrier tubes so that each of them will lock in a common direction of rotation of the composite sprocket wheel, clockwise in this embodiment of the invention, to the input shaft 18 at their design inner and outer race angular velocity differentials.

Cup-shaped drive housings 70, as shown in FIGS. 2 and 6, are located over the sprag clutches 68 and are fixed by welding or any other suitable fastening arrangement to the machine input shaft 18 with their open end portions fixed in apertures in the chain guide discs 20. The outer races of the sprag clutches are fixed by keys, fasteners or the like to the inner surfaces of the drive housings 70.

With the above arrangement the drive path through the sprocket wheel assembly 10 is from the input shaft 18, through the drive housings 70, individually through the sprag clutches, the carrier tubes 62, 64 and the wheel bodies 28 and their sprockets 30 to the drive chain 12.

Figure 9:
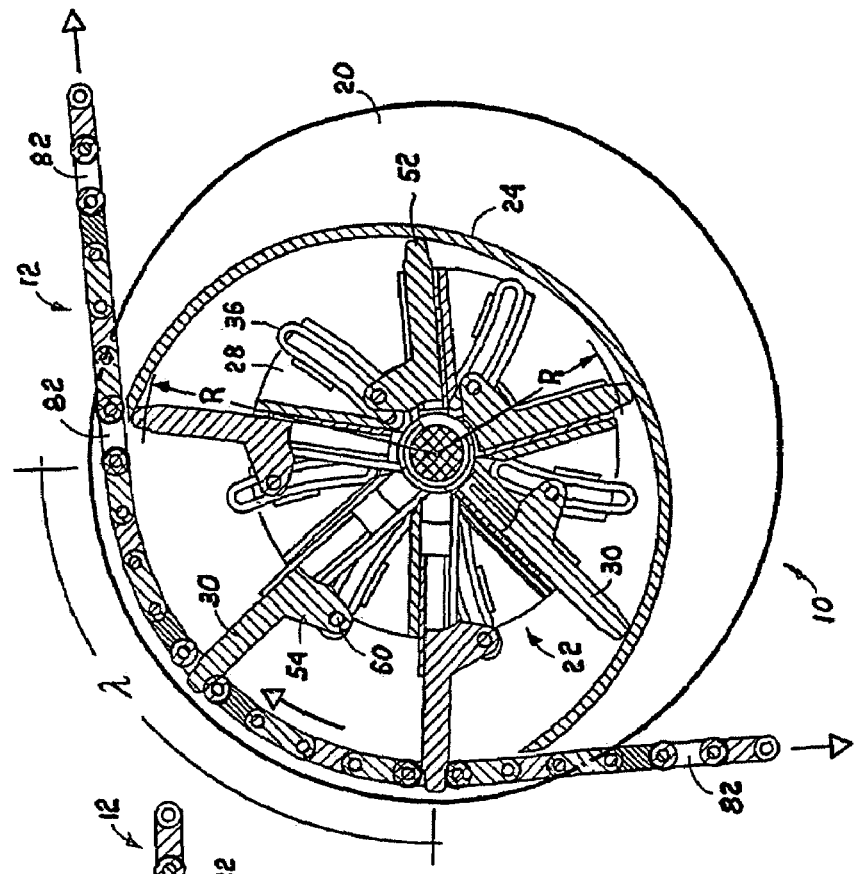
FIGS. 8 and 9 are each a side elevation of the variable diameter sprocket arrangement of the machine of the invention with a chain positioning disc removed with the drawings respectively showing the sprocket arrangement in the high and low ratio positions of the sprocket arrangement.

As shown in FIGS. 1 and 6, compression springs 72 are located over the drive housings 70 to act between the outer surface of the chain guide discs 20 and stop plates 74 which are adjustably fixed to the input shaft 18 to bias the discs 20 towards each other. The spring bias force on the discs is such that the force is moderate when the chain between the discs is in the high ratio position of the machine, as shown in FIG. 9, and increases progressively as the chain is moved on the discs to the machine low range position shown in FIG. 8.

The chain 12, in this embodiment of the invention, is shown in FIGS. 1 and 7 to consist of two conventional sprocket chains 76 which are held in a spaced parallel relationship by what amounts to a third drive chain 78 of solid links with the links of the three chains being interconnected by common link pins 80, as shown in FIG. 7. The ends of the link pins 80 are angularly bevelled at an angle which corresponds to the angle of taper of the inner face portions 26 of the guide discs 20, as shown in FIG. 7.

The outer chains 76 of the composite chain 12 are engaged with the chain positioning sprockets 14, shown in FIG. 2, as well as with double sprockets of whatever is to be driven 16 by the IVT.

The central drive chain has sprocket engaging apertures 82 at regular intervals over the length of the chain 12. In this case the apertures 82 are separated from each other by four links.

It is important to this embodiment of the invention that the profiled nose 52 of each of the sprockets 30 is, in cross-section smaller than that of the chain 12 apertures 82 to enable the noses 52 easily to enter and be withdrawn from the apertures. It is, however, equally important that the bodies of the sprockets below the noses 52 are prevented from entering the apertures 82 as with the machine control arrangement described below the chain 12 needs to be radially movable between the chain guide discs 20 by the sprockets 30. To overcome problems in this regard the sprockets 30 could include transverse formations 83, as shown in FIG. 3 but which are omitted from the remaining drawings for clarity of illustration, on either side of the sprockets directly below their noses 52. The purpose of the second lower formations 83 will be explained below with reference to the machine control arrangement of FIGS. 10 and 11.

Figure 8:
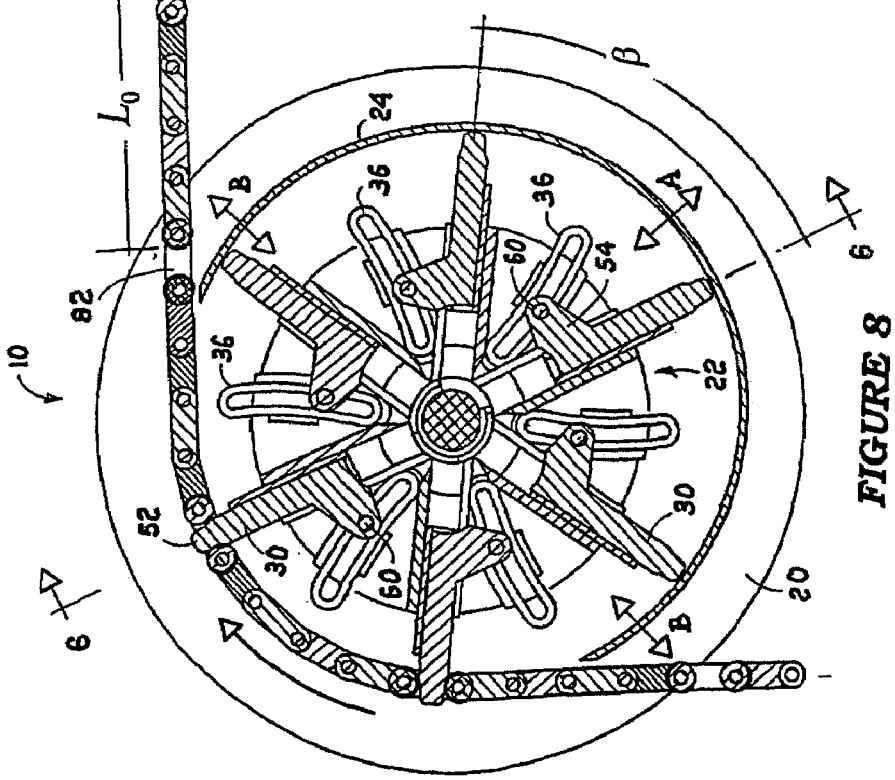

The control element of the machine is shown in FIGS. 2, 8 and 9 to consist fundamentally of an arcuate spring element 24 the inner surface of which provides a track on which the noses 52 of the sprockets 30, which are not engaged with the chain 12, run during rotation of the sprocket wheel 22.

Whatever control system is employed to operate the control element 24 it must be capable of moving the base of the element 24 towards and away from the input shaft 18 in the direction of the arrows A and concomitantly move its free ends inwardly or outwardly as required in the direction indicated by the arrows B in FIG. 8 to maintain its approximate circularity with the chain 12 in the arcuate sprocket engage zone of the sprocket wheel arrangement 10.

One embodiment of such a control system is illustrated in FIGS. 10, 11 and 12 in which the system is shown to include a control plate 84 which, as shown in FIG. 10, carries two identical lever systems and a control arm 86 by means of which the plate 84 is moved, from the outside of the machine casing, in the directions of the arrow in FIG. 10.

The lever systems, on each side of the control element 24, each include a first lever 88 which is pivotally connected at 90 to the plate 84. The lower end of the lever carries trunnions pins 92 with the pin on the back of the lever passing through an elongated hole 94 in the plate 84 to be slidably located in a slot 96 which is shown located in the casing component in FIG. 12. The casing component of the machine opposite that illustrated in FIGS. 10 and 12 carries identically sized and positioned slots to those shown in FIG. 10 and the outwardly projecting trunnion pin 92 of the lever 88 is located in the equivalent slot in the opposite casing component. The upper end of the lever 88 carries a formation, not shown, which bears directly on the outer surface of the element 24.

The lever systems each include a second lever 98 which, like the lever 88, is pivotally connected at 100 to the plate 84 with its hidden trunnion pin 102 passing through an elongated slot 104 in the plate 84 and into a casing slot 106. The visible pin 102 is similarly located in an opposite casing slot 106. The upper end of the lever 98 carries a formation which bears directly on the element 24 adjacent its free end beneath the chain 12.

The third lever 108 in each of the lever systems is made up of two spaced plates each of which is shaped as shown in FIG. 10. The upper end of this lever is shaped to include a profiled head which together with the gap between the plates is adapted to engage and guide the transition of the sprocket 30 nose 52 into and from the chain apertures 82 from and onto the inner surface of the control element 24. The head portion of the lever is pivotally connected at 110 to the end of the lever 98 adjacent its formation which bears on the element 24. The lower end of the lever carries, as do the others, trunnion pins 112, one of which passes through an elongated hole 114 in the plate 84 and into a slot 116 in the casing with the other located in a slot 116 in the opposite casing component. The purpose of the lower transverse formation 83 on each of the sprockets is here important as the pointed noses of the profiled head of the levers 108 engage the sprockets between the two formations 83 and the two formations become particularly useful in enabling the head on the arm which is uppermost in FIG. 10 to engage and cleanly withdraw the sprocket noses from the chain apertures 82.

The chain positioning sprockets 14 are held spaced apart by an axle which terminates on the outside of each of the sprockets in an elongated axle box 118 which is slidably engaged in slots 120 in the opposite casing portions. The axle boxes 118 are connected to arms which are bridged at the free ends by a connecting pin which is slidably located in an angled elongated slot 112 in the plate 84.

The control arm 86 of the control system plate 84 is movable backwards and forwards in the direction of the arrows in a casing slot, not shown, by means of any suitable control positioning system such as a lead screw arrangement or the like to vary the input/output ratio of the IVT machine.

The machine ratio is increased by moving the arm 86 upwardly in FIG. 10 to cause the arms in each of the lever systems to move upwardly in the casing slots and outwardly to follow the chain 12 to its position of greater diameter on the sprocket wheel arrangement 10 while enabling the control element 24 to expand to a greater diameter while controlling its circularity with the engaged zone of the chain 12 as illustrated in FIG. 8. Moving the arm 84 downwardly causes the levers to compress the control element to a smaller diameter and so lower the machine ratio as illustrated in FIG. 9. As the control plate 84 is moved by its controller the chain positioning sprockets 14 are moved backwards or forwards in the casing slots 120 as the zone of the chain engagement radius is altered in a machine ratio change to ensure that the chain maintains a 90° zone of engagement with the chain at all times.

In use, as shown in FIGS. 8 and 9, in order for the noses 52 of the sprockets 30 of the sprocket wheel arrangement always to be synchronised for clean engagement with the apertures 82 in the drive chain 78, the angle β between two consecutive sprockets 30 must follow the following relationship:

$$\beta = \frac{L_0 \cdot 180°}{\pi \cdot R} \text{ in degrees} \quad (A)$$

where
L₀ is the fixed chain aperture 82 interval length as shown in FIG. 8,
R is the engage radius of the sprocket noses 52 which dictate angle β, through the curvature of the control guide 36 slots between a leading sprocket 30 nose 52 and the nose 52 of a sprocket immediately following it in the direction of rotation of the variable sprocket wheel 22.

Thus the radius of a particular sprocket nose 52 from the axis of the input shaft 18 regulates the angle β between that nose 52 and the one behind it in the direction of rotation of the sprocket wheel 22 according to equation A which limits the operation of the variable sprocket machine of the invention to operate in only one direction of rotation. Because all of the wheel bodies 28 and sprockets 30 are interlinked in a circular fashion the different β angles will add up to 360° or:

If the subscript 1 to 6 denotes the respective β angle then $$\beta_1 + \beta_2 + \beta_3 + \beta_4 + \beta_5 + \beta_{6} = 360° \quad (B)$$

By using equations A and B a relation among the engage radiuses $R_{1-6}$ (using the same subscript notation) is formed as follows:

$$\frac{L_0 \cdot 180°}{\pi \cdot R_1} + \frac{L_0 \cdot 180°}{\pi \cdot R_2} + \frac{L_0 \cdot 180°}{\pi \cdot R_3} + \frac{L_0 \cdot 180°}{\pi \cdot R_4} + \frac{L_0 \cdot 180°}{\pi \cdot R_5} + \frac{L_0 \cdot 180°}{\pi \cdot R_6} = 360°$$

which simplifies to $$\left(\frac{1}{R_1} + \frac{1}{R_2} + \frac{1}{R_3} + \frac{1}{R_4} + \frac{1}{R_5} + \frac{1}{R_6}\right) = \frac{2 \cdot \pi}{L_0} \quad (C)$$

During operation of the variable sprocket IVT machine the driven input shaft 18 will engage with sprag clutches 68 associated with the sprockets 30 travelling at the slowest angular velocity relative to input shaft 18. These sprockets 30 will be associated with the largest of the sprocket nose 52 radii relatively to input shaft 18 and will thus represent all of the sprocket nose 52 radii engaged with the chain 12.

The above serves only as an example of a concept thus the number of wheel bodies 28 is not limited to six but may be any suitable number.

The control element 24 may also be replaced by springs positioned within the sprocket wheel assembly 10 which are controlled by some internal or external means to move the interlinked sprocket wheel assembly 10 sprockets 30 towards a larger radius in the direction of the chain 12.

Two of above mentioned IVT machines may be used on the same output chain to act as the input and output of a new system respectively while positionable conventional guide sprockets guide the output chain to maintain the chain drive angle on both IVT machines thus increasing the ratio range of the composite IVT machine.

In certain applications, typically low speed, for example in bicycles, the chain discs 20 may be omitted. In such a case tension in the chain 12 itself would provide a means to guide the chain 12 against the engaged noses 52 engaged with it. However this embodiment is not limited to bicycles but may apply to any other application.

In yet another embodiment of the variable sprocket IVT machine the control of element 24 may be simplified to a number of springs around its circumference applying a force on the noses 52 engaged with control element 24 to move the IVT machine into the high ratio. The degree to which the IVT machine is moved into the high ratio is balanced by the tension in the chain 12 in order to create a torque activated IVT machine, where in this case the chain discs 20 may also be omitted as mentioned above.

The invention claimed is:
1. A variable sprocket IVT machine comprising:
an angular velocity input shaft [18],
a sprocket wheel [22] which is rotatably mounted on the input shaft [18] and includes a plurality of elongated sprocket tooth elements [30] which are each slidably located in and project in a common plane from radially oriented sleeves [34] in the sprocket wheel [22], an endless flexible drive element [12] which is spaced from and partially surrounds the sprocket wheel [22] in a zone in which the drive element is sprocket-driven and includes apertures [82] which are spaced at uniform intervals over a length of the drive element and in which free ends [52] of the sprocket tooth elements [30] are sequentially engageable to drive the element [12] as the sprocket wheel [22] is rotated by the input shaft [18], a track arrangement [20] on which edges of the drive element [12] are supported in a drive zone of the drive element, means [72] for varying a radius of the drive element [12] drive zone on the track arrangement[20, 21], a drive element [12] tensioning arrangement [14] for maintaining tension on the drive element [12] as the radius of the drive element [12] drive zone on the track arrangement [20] is varied, and an output shaft [16] which is driven by the drive element, characterised in that:

each of the sprocket wheel [22] sleeves [34] is located in a wheel body [28] which is independently rotatable relative to other said wheel bodies [28] on the input shaft [18], connecting arrangements [36, 54, 60] connecting the wheel bodies [28] to each other to provide a composite sprocket wheel [22] with the connecting arrangements [36, 54, 60] being adapted to regulate a degree of angular disposition of each said wheel body [28] relative to the following said wheel body [28] in the composite sprocket wheel and a radial dimension [R] of the sprocket tooth elements [30] carried by the wheel bodies in a predetermined relationship so that irrespective of the radial distance separating the drive element [12] drive zone from the input shaft [18] a said sprocket tooth element [30] which is engaged in a said drive element aperture [82] in the drive zone will position the free end [52] of the following sprocket tooth element [30] exactly for engagement in the next drive element [12] aperture [82], means for supporting the sprocket tooth elements [30] of the sprocket wheel [22] which are not engaged with the drive element [12] during rotation of the composite sprocket wheel [22], means [68] for engaging the wheel bodies [28] of the sprocket tooth elements [30] which are engaged with the endless flexible member [12], with the input shaft [18], and a control arrangement [84, 86] for moving the sprocket tooth element [30] support means [24] to vary the ratio of rotation of the output shaft [16] relatively to the input shaft [18] during operation of the machine.

2. An IVT machine as claimed in claim 1 wherein the sleeves [34] in the wheel bodies [28] are slidably movable in passages [38] in the wheel bodies [28].

3. An IVT machine as claimed in claim 1 wherein the wheel body [28] connecting arrangements [36, 54, 60] each include a curved formation [36] on the wheel body [28] which extends in a substantially radial direction from the input shaft [18] axis at a predetermined angle to the wheel [22] body sleeve [34] and which is curved to have a concave shape towards the sleeve body and formation engaging means [54], on the sprocket tooth element [30] of a leading adjacent said wheel body [28] in the direction [34] of rotation on the sprocket wheel [22], which is slidably engageable with the curved formation [36] of the wheel body [28] immediately trailing it in the sprocket wheel [22].

4. An IVT machine as claimed in claim 3 wherein the formation engaging means on the sprocket tooth elements [30] are lugs [54] which are fixed to and project from the sprocket tooth elements [30] away from the direction of rotation of the sprocket wheel [22].

5. An TVT machine as claimed in claim 4 wherein the curved formation [36] on each of the wheel bodies [28] is a slot and the sprocket lugs [54] each carry a pin [60] which is slidably located in the slot formation [36] of the wheel body [28] behind it in the direction of rotation of the sprocket wheel [22].

6. An IVT machine as claimed in claim 5 wherein the slot formation on each wheel body is located in a guide plate [36] which is slidably located in the substantially radial direction in a complementary shaped recess [46] in the wheel body [28].

7. An IVT machine as claimed in claim 1 wherein the track arrangement [20, 20] for supporting the drive element is located on the machine input shaft [18] and includes a disc [20] on either side of the sprocket wheel [22] with each said disc [20] including, from a central zone of its face which faces the sprocket wheel [22], a surface [26] which tapers outwardly from the central zone to the periphery of the disc [20] with the tapered surfaces [26] of the discs [20] providing between them a track on which the edges of the drive element [12] are supported and means [72] biasing each of the discs [20] towards the other.

8. An IVT as claimed in claim 1 wherein the means for engaging the wheel bodies with the machine input shaft are one-way sprag clutches [68] and connecting means [62, 64] connecting each of the clutches to a said wheel body of the sprocket wheel.

9. An IVT as claimed in claim 8 wherein the connecting means [62a,b,c and 64a,b,c] are tubes which are located concentrically one within the other on the machine input shaft [18] with the tubes being divided into two sets which each face away from the sprocket wheel [22] with each fixed at one end to a said wheel body [28] and at another end to an inner race of a spag clutch [68].

10. An IVT as claimed in claim 9 including a cup-shaped drive housing [70] which is located over each set of said sprag clutches on either side of the sprocket wheel [22] with closed ends of the cup-shaped housings fixed to the input shaft [18], open ends to the drive element track arrangement discs [20] and inner surfaces to outer races of the sprag clutches [68] so that each of the clutches [68], attached to a wheel body [28] while sprocket tooth element [30] is in the drive zone of the drive element [12], will lock, in a common direction of rotation of the sprocket wheel [22], to the input shaft [18].

11. An IVT as claimed in claim 1 wherein the sprocket support means includes an arcuate spring blade element [24] which partially surrounds the sprocket wheel [22] with an inner surface of the spring blade element providing a track on which the free ends [52] of the sprocket tooth elements [30], which are not engaged with the drive element [12], run during rotation of the sprocket wheel [22].

12. An IVT as claimed in claim 11 wherein the control arrangement [84, 86] includes a controller [86] for moving the arcuate element [24] towards and away from the machine input shaft [18] and means [88, 98, 108] for concomitantly moving free ends of the arcuate element inwardly or outwardly as required to maintain its approximate circularity with the drive element [12] drive zone.

* * * * *